US006823129B1

(12) United States Patent
Goertzen

(10) Patent No.: US 6,823,129 B1
(45) Date of Patent: Nov. 23, 2004

(54) SCALEABLE RESOLUTION MOTION IMAGE RECORDING AND STORAGE SYSTEM

(75) Inventor: Kenbe D. Goertzen, Topeka, KS (US)

(73) Assignee: QuVIS, Inc., Topeka, KS (US)

( * ) Notice: Subject to any disclaimer, the term of this patent is extended or adjusted under 35 U.S.C. 154(b) by 0 days.

(21) Appl. No.: 09/498,323

(22) Filed: Feb. 4, 2000

(51) Int. Cl.[7] .......................... H04N 5/76; H04N 7/26; H04N 7/12; G11B 5/00; G06K 9/36
(52) U.S. Cl. .................. 386/46; 386/111; 386/124; 360/8; 360/38; 375/240.11; 382/232
(58) Field of Search ................ 386/1, 45, 46, 386/125, 126, 124, 111–112, 33; 348/441, 443, 445, 446, 448, 453, 454, 458, 459; 711/114; 375/240.11; 382/232; 360/8, 32; H04N 5/76, 5/781

(56) References Cited

U.S. PATENT DOCUMENTS

| | | | | |
|---|---|---|---|---|
| 5,065,430 A | * | 11/1991 | Torii et al. ............... | 380/38 |
| 5,604,838 A | * | 2/1997 | Schaefer .................. | 386/122 |
| 5,883,978 A | * | 3/1999 | Ono ....................... | 382/248 |
| 5,978,514 A | * | 11/1999 | Yamaguchi et al. ........ | 382/243 |
| 6,091,775 A | * | 7/2000 | Hibi et al. ............... | 375/240.11 |
| 6,226,038 B1 | * | 5/2001 | Frink et al. .............. | 348/443 |
| 6,298,160 B1 | * | 10/2001 | Goertzen ................. | 382/232 |
| 6,332,058 B1 | * | 12/2001 | Kawakami ................ | 386/111 |
| 6,400,768 B1 | * | 6/2002 | Nagumo et al. .......... | 375/240.18 |
| 6,459,816 B2 | * | 10/2002 | Matsuura et al. ......... | 382/248 |
| 6,526,225 B1 | * | 2/2003 | Windrem et al. ......... | 386/125 |
| 6,532,308 B1 | * | 3/2003 | Goertzen ................. | 382/240 |
| 6,603,922 B1 | * | 8/2003 | Shino et al. ............. | 386/125 |
| 6,636,643 B1 | * | 10/2003 | Goertzen ................. | 382/240 |
| 6,661,925 B1 | * | 12/2003 | Pianykh et al. .......... | 382/239 |
| 6,693,961 B1 | * | 2/2004 | Azadegan ................ | 375/240.11 |
| 6,718,065 B1 | * | 4/2004 | Goertzen ................. | 382/240 |
| 2003/0097504 A1 | * | 5/2003 | Oeda et al. .............. | 710/104 |
| 2003/0158987 A1 | * | 8/2003 | MacInnis et al. ......... | 710/240 |

* cited by examiner

*Primary Examiner*—Thai Tran
(74) *Attorney, Agent, or Firm*—Bromberg & Sunstein LLP

(57) ABSTRACT

A system for scaling resolution of an input stream includes an input for receiving the image input stream which passes the image input stream to a frame buffer. The frame buffer holds one or more image frames such that a router can decorrelate the image input stream. Decorrelation may be accomplished by spatially transforming the frames of the input image stream into frequency components, temporally transforming frames of the input image stream or through color component decomposition. The decorrelated components are each passed to a processor which performs quantization and entropy encoding of the components. Each of the compressed components are passed to memory for storage. Thus, real-time throughput can be increased above the rate of the individual processing elements through decorrelation.

14 Claims, 2 Drawing Sheets

SCALEABLE RESOLUTION MOTION IMAGE RECORDING AND STORAGE SYSTEM

RELATED APPLICATION

The subject matter of this application is related to the subject matter of the following commonly owned applications: Ser. No. 09/112,668, now U.S. Pat. No. 6,298,160 B1, titled "Apparatus And Method For Entropy Coding", filed on Jul. 9, 1998, also by Kenbe Goertzen; Ser. No. 09/498, 925, now U.S. Pat. No. 6,636,643 B1, titled "A System And Method For Improving Compressed Image Appearance Using Stochastic Resonance And Energy Replacement", filed concurrently, also by Kenbe Goertzen; Ser. No. 09/499, 091, now U.S. Pat. No. 6,718,065 B1, titled "Optimized Signal Quantification", filed concurrently, also by Kenbe Goertzen; and, Ser. No. 09/498,924, now U.S. Pat. No. 6,532,308 B1, titled "Quality Priority Image Storage and Communication", filed concurrently, also by Kenbe Goertzen; the contents of which are incorporated by reference as if fully disclosed herein.

TECHNICAL FIELD

This invention pertains to the field of digital signal compression and quantification. More specifically, the present invention related to a system and method that provides scaleable resolution image recording and storage.

Shortcomings of Prior Art

Electronic motion image recorders have traditionally been designed for one or at most only a few motion image formats. With the advent of various high definition video, medical, scientific, and industrial formats, there is a requirement for single systems which can support a broad range of motion image formats. As motion image frame rates, image sizes, and pixel resolutions increase, there is a tremendous increase in the amount of data that must be maintained to represent the motion image stream in the sample domain. This places a large burden on the processing, storage, and communications costs to support these data sets at the desired resolution.

SUMMARY OF INVENTION

The present invention provides an efficient and cost effective system which can be configured to effectively support all motion image formats. The system can be modularly expanded to increase throughput, and can trade off system throughput between the number of image streams, their frame rate, frame resolution, and pixel resolution. The system uses subband methods throughout to support variable image size and frame rate recording. This allows a single image stream to be divided into multiple lower rate streams to allow more reasonable processing rates. The present invention also enables the application of a variable sized array of standardized image processing components.

More specifically, optimized storage and efficient communication is achieved by storing image streams in the information domain, rather than the sample domain. This typically provides a dramatic reduction in storage and communication requirements, while still providing a guaranteed recording quality. Unlike conventional video tape recorders, this system can also place recordings onto the same removable storage medium at any desired image resolution, frame rate, and quality.

BRIEF DESCRIPTION OF THE DRAWINGS

DETAILED DESCRIPTION

Figure 1:
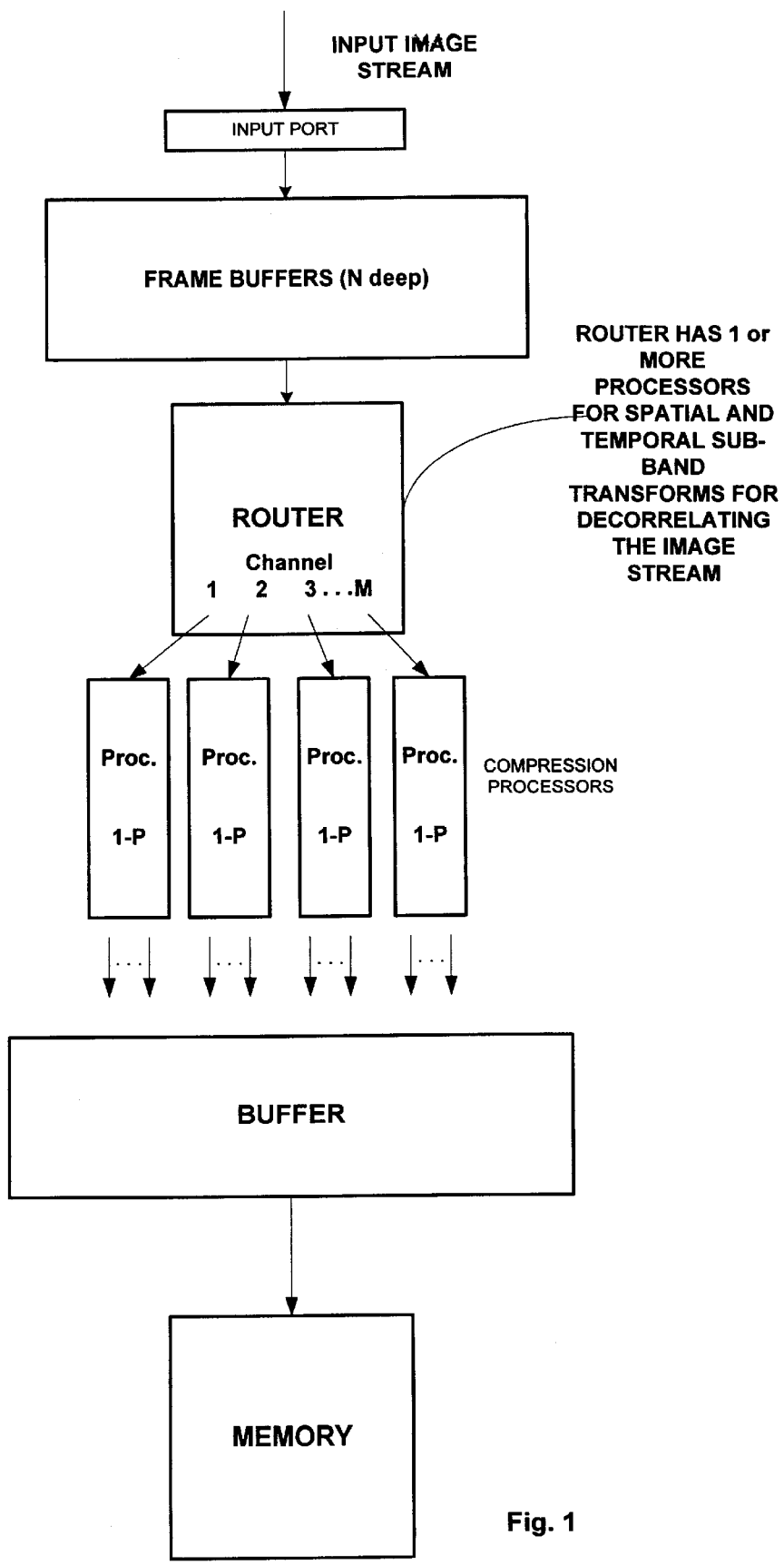
Figure 2:
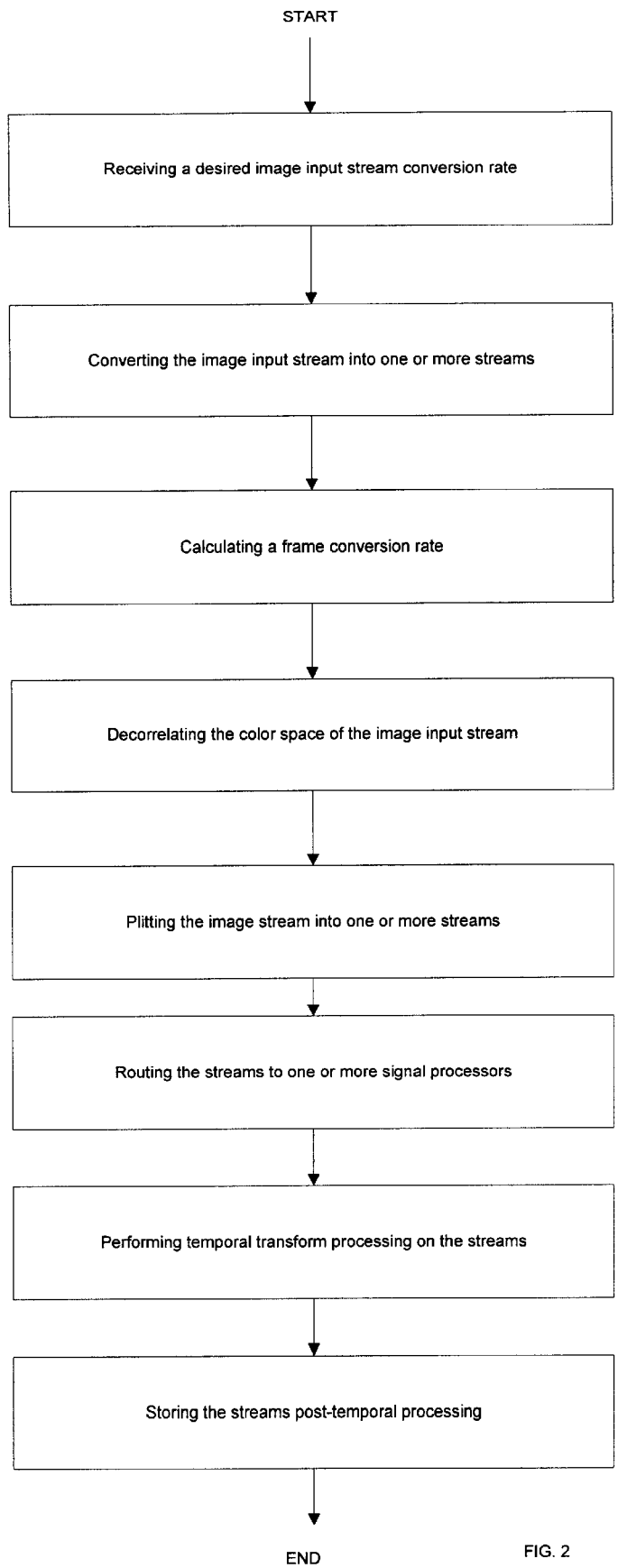

The following description describes the method of the present invention as performed by the system of the present invention. The method described, however, could also be performed by an alternate image processing device.

The following provides a list of components that may be included in the system of the present invention. The function accomplished by each component is also provided. As will be appreciated by one skilled in the art, this list is neither exhaustive nor inclusive and other components that provide similar functionality, such as other band limiters, band splitters or color space conversion modules, may also be added.

| Component | Function |
| --- | --- |
| Input Bandsplit | Input converters and optional analog bandsplit |
| Deframer | digital data stream in |
| Color space | optional RGB -> CbYCr |
| Bandlimit | 1D or 2D Bandlimit and arbitrary rate conversion of components |
| Bandsplit | Full band 2 pixel color to halfband chroma dual pixel "quad" |
| CbYCr -> CbLCrH | |
| | Full band 4 pixel color to visual space "quad" |
| CbYCr -> CbLCrD | |
| | Monochrome to bandsplit "quad" |
| MM -> --L--H | |
| | Monochrome to 2D bandsplit "quad" |
| MMMM -> LHVD | |
| Inverse Pulldown | Sample only a portion of the input fields or frames |
| Framebuffer | Buffer and optional time multiplex frames |
| Interlace Processing | Interlaced image processing, to allow interlaced image to be processed as progressive |
| Router | Routes N streams to N IP channels Using time multiplexed frames Using simple (Harr) temporal bandsplit of frames |
| Temporal IP | Temporal transform and optional time multiplex of frames |
| Interlace Processing | Interlaced image processing, to allow interlaced image to be processed as progressive |
| Spatial IP | Spatial transform |
| Quantification | Component and temporal quantification as required |
| Entropy coding | Entropy coding, potentially for each temporatial and spatial component |
| DMA channels | Provides channels for data movement |
| RAM Queues | Peak buffering |
| Disk Queues | Peak buffering |
| Disk,Tape, or Channel | Final output |
| The IO subsystems accept motion image input streams in one of numerous pixel formats. | |
| RGBA | Red, Green, Blue, and Alpha |
| YCbCrA | Luminance, Blue color difference, Red Color difference, and Alpha |
| YC | Luminance and alternating color difference |
| M | Monochrome |
| MM | Two sequential monochrome samples |
| MMMM | Four sequential monochrome samples |

The input analog converter can operate at up to a fixed rate of N conversions per second, where N is determined by the particular implementation. If a conversion rate higher than N is desired, the input system can use an analog bandsplit of the input signal into two or four streams at one half or one fourth rate to allow multiple channel conversion at or above N.

In one embodiment, the digital IO system converts these input pixel streams into quad component representational streams. In each case, it is assumes that the components have been decorrelated and can be processed separately. If the components have not been decorrelated, however, color space conversion may be used to decorrelate the color components. This could also involve subband splitting certain color components in order to further decorrelate the components and spread the bandwidth evenly among the available channels. While splitting the pixel stream into quad component representations is described as one embodiment, the image processing resources can also process the pixel stream by splitting it into a number of different component representations. For example, the present system may be used to process dual channel image streams. In these cases, the first and third components are assigned to the first channel, and the second and fourth are assigned to the second.

| | |
|---|---|
| CbYCrA | Single color pixel, four component full band |
| CbLCrH | Dual color pixel, two subband luma component (L and H), half band chroma Luma is bandsplit using either a Harr transform, an Odd near orthagonal 7 tap filter, or an Odd near orthagonal 9 tap filter. |
| CbLCrD | Quad color pixel, two halfband luma components (L and D), quarter band chroma. Luma is limited to a diagonal square providing 1/2 the original bandwidth, but full horizontal and vertical response. This is bandsplit using a 2D filter of 3 × 3 or 9 × 9 taps into a low half and a diagonal half. The color is bandlimited to half band in both dimensions. |
| LMMH | Quad monochrome pixel, 1 D four subband components |
| LHVD | Quad monochrome pixel, 2 D four subband components |

The frame buffers can store 1 to N frames of the input stream and distribute 1 to N frames among 1 to N signal processors. This allows time multiplexing image processing resources, or the support of temporal processing in the frame buffer or router. N is determined by the required quad throughput divided by the quad throughput of the individual signal processors. This also allows for support of temporal processing in the frame buffer or router.

The router can accomplish simple spatial or temporal bandsplits. This accomplishes additional decorrelation and allows subdivision of the signal stream among computing resources. It can also be used to support image resolutions or throughputs that exceed the physical buffers or individual throughput supported by the image processing modules.

This system can also perform temporal transform processing. In the preferred embodiment, a temporal processor is required for each quad stream which will require processing. The input to a temporal processor is a stream of image frames. The output is a stream of shuffled temporal transformed frames. For example, if one temporal transform is selected, an alternate stream of low and high temporal component frames is produced. If two temporal transforms are selected, a stream of low, midlow, midhigh, and high temporal component frames is produced. Temporal transforms can be inserted as desired between the router and the spatial transform processor.

From 1 to N spatial signal processors accept the quad streams of frames. They perform a spatial multiband transform, quantify the data to the specified recording signal quality and entropy encode it. From 4 to 4N DMA channels deliver the encoded data to a RAM buffer which handles peak transfer loads.

The data can then be transferred to queuing or output files on disks, tapes, or other peripherals that are capable of storing digital information. If the data rate is higher than the specified peripheral can support, the information is queued to a faster storage device until the desired peripheral can accept the data. In the case of peak tolerant recording at a fixed rate, a phase delay is specified and a hierarchy of processes related to the hierarchy of buffer devices monitor the rate and potentially control the quality level. This allows the process to be as tolerant of peaks as possible. Each process in charge of buffering determines whether the data budget is being exceeded over the time scale of interest to this process. If the local average rate exceeds a set point, the quality level of the images being received by the output or storage device is reduced until the local average rate no longer exceeds the set point. If the average is below the set point, and the quality level is below the target, the quality level of the images is increased.

EXAMPLE

Here is an example of this unique storage process. The target data rate is 12 MB/S and a quality level may be 66 dB. This would allow peaks rates as high as 80 megabyte per second to occur for one frame time, peaks as high as 40 to occur for up to about a second, and peaks up to 20 megabyte per second for a few seconds. The steps up or down are all added together and to the target to obtain the next quality level. The quality level is re-computed for every frame.

| Process | Timescale | Setpoint | Peak Rate | dB Steps |
|---|---|---|---|---|
| To RAM | 4 Frames | 40 MB/S | 80 MB/S | 3 dB |
| To Disk | 4 second | 20 MB/S | 40 MB/S | 1 dB |
| To Tape/Channel | 30 second | 10 MB/S | 12 MB/S | 1/2 dB |

The playback process is a reversal of the recording process, with the exception that playing from a slower peripheral than required induces a preroll time while a faster peripheral is used to queue the required amount of data. A preroll time is the time needed to transfer data from a slower peripheral to a faster storage device. For example, if the data was stored on a compact disc, the data could be prerolled to RAM in order to provide playback at the appropriate frame rate and quality level.

Although the description above contains many detailed descriptions, these descriptions should not be construed as limiting the scope of the invention but merely as providing illustrations of some of the presently preferred implementations of this invention. For example, although this method was described with reference to standard motion and still images, this method can be used to optimize quantification of any signal stream. Thus the scope of the invention should be determined by the appended claims and their legal equivalents, rather than by examples given.

I claim:

1. A method for processing an image input stream, the method comprising:

receiving a desired image input stream conversion rate;

converting the image input stream into one or more representational streams;

calculating a frame conversion rate;

responsive to the frame conversion rate being lower than the desired conversion rate and to the image input stream components being correlated, converting the color space of the image input stream;

splitting the image input stream into one or more representational streams;

routing the image streams to one or more signal processors; and performing temporal transform processing on the representational streams; and storing the representational streams post-temporal processing.

2. The method of claim 1, wherein the step of converting the image input stream into one or more representational streams comprises splitting the image stream into four quad component representations.

3. The method of claim 1, wherein the step of converting the image input stream into one or more representational streams comprises applying an analog bandsplit to the stream.

4. The method of claim 1, wherein the step of performing temporal transform processing on the representational streams comprises using a separate temporal processor to process each representational stream.

5. The method of claim 1, wherein the step of performing temporal transform processing on the representational streams includes performing a spatial mutliband transform of the stream.

6. The method of claim 1, wherein the step of performing temporal transform processing on the representational streams comprises using a separate temporal processor to process each representational stream.

7. The method of claim 5, wherein the step of performing temporal transform processing on the representational streams includes entropy encoding the stream.

8. The method of claim 1, wherein the step of storing the streams comprises:

calculating the data budget of a first storage device used to store the data;

responsive to the stream requiring a data budget higher than is supported by the first storage device, queuing the data to a second storage device until the first storage device is able to accept the stream.

9. A method for processing an image input stream composed of components and having a throughput, the method comprising the steps of:

receiving an image input stream;

calculating a frame conversion rate;

responsive to the frame conversion rate being lower than the throughput and responsive to the image input stream components being correlated;

splitting the image input stream into one or more representational streams using sub-band coding;

routing the image streams to one or more signal processors;

performing quantization and entropy encoding on the representational streams; and storing the encoded representational streams.

10. The method of claim 9, further comprising:

splitting the image stream into four quad component representations.

11. The method of claim 9, further comprising:

applying an analog bandsplit to the image stream.

12. The method of claim 9, wherein after routing the image streams to one or more signal processors using a separate temporal processor to process each representational stream.

13. The method of claim 9, after routing the image streams to one or more signal processors, performing a spatial sub-band transform on the stream.

14. The method of claim 9, wherein the step of storing the streams comprises:

calculating the data budget of a first storage device used to store the data;

responsive to the stream requiring a data budget higher than is supported by the first storage device, queuing the data to a second storage device until the first storage device is able to accept the stream.

* * * * *